J. PETRELLO.
PULLEY.
APPLICATION FILED OCT. 20, 1917.
1,267,333.
Patented May 21, 1918.
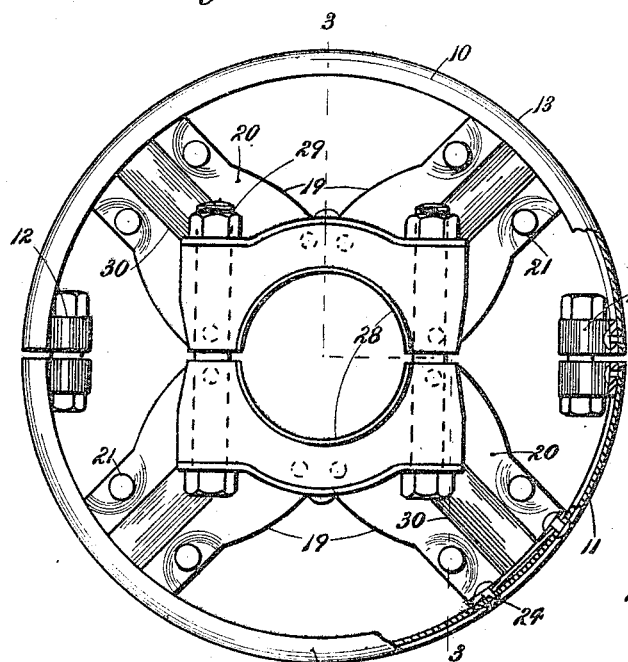
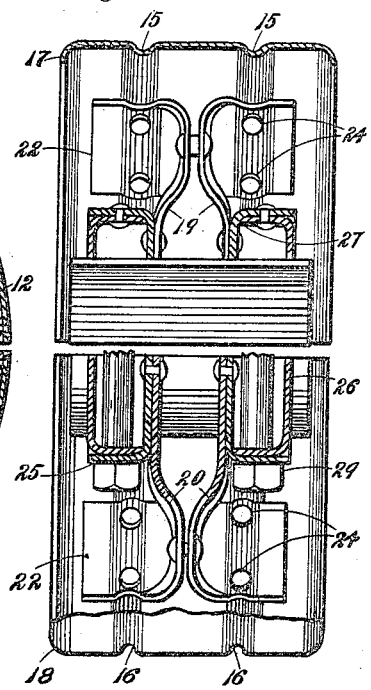
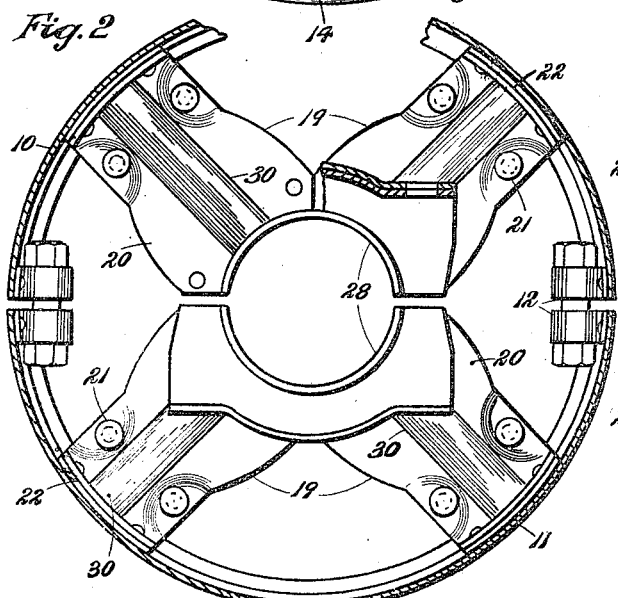
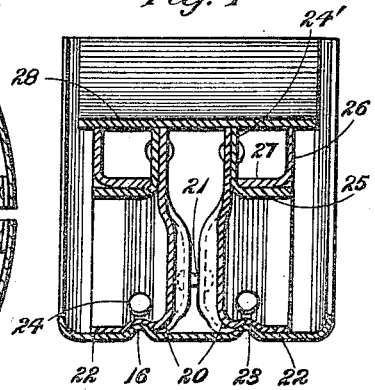
Witness
Alfred T. Bratton
Inventor
Joseph Petrello,
By Victor J. Evans
Attorney.

UNITED STATES PATENT OFFICE.

JOSEPH PETRELLO, OF PHILADELPHIA, PENNSYLVANIA.

PULLEY.

1,267,333.     Specification of Letters Patent.     Patented May 21, 1918.

Application filed October 20, 1917. Serial No. 197,694.

*To all whom it may concern:*

Be it known that I, JOSEPH PETRELLO, a citizen of Russia, residing at 2535 E. Madison street, Philadelphia, in the county of Philadelphia and State of Pennsylvania, have invented new and useful Improvements in Pulleys, of which the following is a specification.

The invention relates to pulleys and has for an object to provide a split pulley of [illegible]

steel the same as the rims of the pulley. Each pair of spokes consists of two side pieces 20 riveted together at 21, with the outer ends of the side pieces bent to form right-angled ends 22 having grooves 23 therein fitting over the circumferential grooves 15, 16 with rivets 24 passing through the grooves 15, 16 and the grooves 23 to securely rivet the outer ends of the spokes to the periphery of the pulley. The inner [illegible]

material employed and the manner in which it is assembled.

I claim:

1. A split pulley comprising connectible hub sections and connectible rim sections, spokes connecting said hub and rim sections, each of said spokes consisting of a pair of side pieces with each side piece formed of a single piece of metal and terminating at the outer end in a right-angled portion secured to the rim section, the side pieces intermediate their ends being bent toward each other and riveted together, inner and outer hub pieces forming said hub sections, with the inner ends of the side pieces of the spokes rigidly secured to the inner faces of the inner hub sections, said inner and outer hub pieces having right angled flanges formed thereon, the flanges on the inner hub pieces overlapping the flanges on the outer hub pieces, and bolts for removably securing said hub sections together.

2. A split pulley comprising hub sections and rim sections, each hub section comprising an inner hub piece and an outer hub piece having ends bent at right-angles, the right-angled end of the inner hub piece overlapping the right-angled end of the outer hub piece, and spokes radiating from said hub pieces and connected with the rim sections, the inner ends of the spokes being secured to the inner hub pieces.

3. A split pulley comprising hub sections and rim sections, said rim sections being formed with peripheral ribs, spokes connecting said hub sections and rim sections, said spokes each comprising opposed side pieces with the inner ends of the side pieces riveted to the inner portions of the hub sections, and the outer ends of the side pieces grooved to fit the ribs in the rim sections and riveted through said grooves to said rim sections, said side pieces of each spoke, intermediate their ends, being bent toward each other and riveted together.

In testimony whereof I affix my signature.

JOSEPH PETRELLO.

Copies of this patent may be obtained for five cents each, by addressing the "Commissioner of Patents, Washington, D. C."